Oct. 17, 1967       D. W. HOWGATE       3,348,135
METHOD AND APPARATUS FOR ANALYSIS OF GASEOUS
DISCHARGE PRODUCTS FROM FLAMES BY
ELECTRON-PARAMAGNETIC RESONANCE
Filed June 3, 1964

David W. Howgate,
INVENTOR.

BY Harry M. Saragovitz
Edward J. Kelly
Herbert Berl
James E. Staudt

United States Patent Office
3,348,135
Patented Oct. 17, 1967

3,348,135
METHOD AND APPARATUS FOR ANALYSIS OF GASEOUS DISCHARGE PRODUCTS FROM FLAMES BY ELECTRON-PARAMAGNETIC RESONANCE
David W. Howgate, Athens, Ala., assignor to the United States of America as represented by the Secretary of the Army
Filed June 3, 1964, Ser. No. 372,437
10 Claims. (Cl. 324—.5)

ABSTRACT OF THE DISCLOSURE

A gas inlet line feeds gases to a quartz tube which is located in part within a microwave cavity. A RF exciter located upstream of the cavity increases the state of excitation of the gases. Between the exciter and the cavity two conductive sleeves apply a DC electric field to the gases. The cavity is in a variable magnetic field and is supplied with microwave energy from a spectrometer. The spectrometer measures the amount of microwave energy absorbed by the gases in relation to the strength of the magnetic field.

---

The invention described herein may be manufactured and used by or for the Government for governmental purposes without the payment of any royalty thereon.

The present invention relates to a method and apparatus for analysis of the gaseous products of combustion from rocket motors and the like.

There has been a continuing need for a device and method for safely and accurately analyzing the hot combustion products of missile power plants. An accurate and complete quantitative and qualitative analysis of the products of combustion of rocket motors provides vital research information which is essential for the improvement of the performance as well as the efficiency of rocket motors and their fuels. The present invention may be operated by remote control thus allowing operating personnel to maintain a safe distance from the vicinity of the operating rocket motor.

The present invention involves a unique apparatus and method for determining the atomic and molecular composition of rocket motor exhaust products.

The apparatus embodies the analysis of discharge products from flames through their absorption of microwave energy in a DC magnetic field. The state of excitation of the gases as they are exhausted from a rocket motor and enter the analyzer may be increased by subjecting the gases to a pulse or CW input of electromagnetic energy. The gaseous exhaust products are then pumped at low pressure through a quartz tube. This tube is located within a high "Q" microwave cavity. To supply the necessary energy detection potential, a paramagnetic resonance spectrometer is connected to the microwave cavity. The DC magnetic field strength is varied to provide a spectrum of the molecular or atomic resonance within the paramagnetic species being detected. This spectrum indicates the change in the rate at which energy is absorbed within a given paramagnetic species for a corresponding change in magnetic field strength. The detected signal is displayed graphically and provides information of qualitative and quantitative nature.

This analysis is effective on gases having a magnetic dipole moment, gaseous free radicals and other paramagnetic species. The technique is especially effective for the qualitative and quantitative determination of the hydroxyl radical and of the atomic forms of hydrogen, nitrogen, and oxygen.

The present invention is very discriminatory in that it detects only combustion products of the type described. This high sense of discrimination by the apparatus results in excellent resolution which is essential to a good quantitative and qualitative analysis.

Accordingly, an object of this invention is to provide a system for the qualitative and quantitative analysis of rocket motor exhaust gases.

Another object of this invention is to provide an analysis system which achieves a high degree of accuracy through the use of paramagnetic resonance techniques.

Still another object of my invention is to provide an exhaust gas analyzer which may be operated remotely.

Yet another object of my invention is to provide a gas analyzer which is extremely safe to operate.

Another object of my invention is to provide a gas analyzer which is relatively inexpensive to manufacture and operate.

Other features of my invention will become apparent in due course from the following description hereof with reference to the accompanying drawings given primarily by way of example and in which.

Figure 1:
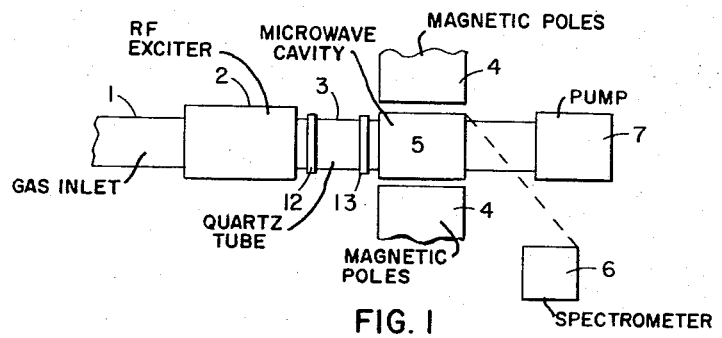
FIGURE 1 is a block diagram illustrating the relative arrangement of the components of my invention.

Referring now to FIGURE 1, a sealed continuous gas inlet line 1 passes through the exciter 2 which produces electromagnetic energy. An RF coil has proved to function very well as an exciting means. The inlet line is connected to a cylindrical quartz tube 3. A pair of magnetic poles 4 are located on opposite sides of the quartz tube. To provide detection potential, a conducting cylinder 5 surrounds the quartz tube and is located within the field area of the magnetic poles. An electron paramagnetic resonance spectrometer 6 supplies microwave energy to a microwave cavity defined by cylinder 5 and also detects and produces graphically the energy transformations which take place within the cavity. A vacuum pump 7 is connected to the downstream side of the quartz tube to provide a motive force and in certain cases to reduce the pressure of the gases being analyzed. It is generally desirable to protect the vacuum pump by locating a cold trap or similar device immediately upstream from the pump. However, when analyzing certain products of combustion care must be taken to prevent their accumulation which in some cases may present an explosion hazard. A pair of conductive sleeves 12 and 13 surround the quartz tube between the exciter and the microwave cylinder. These sleeves are connected to a voltage source and serve to reduce the noise level transmitted to the spectrometer under certain conditions which will be explained in detail hereinafter.

Figure 2:
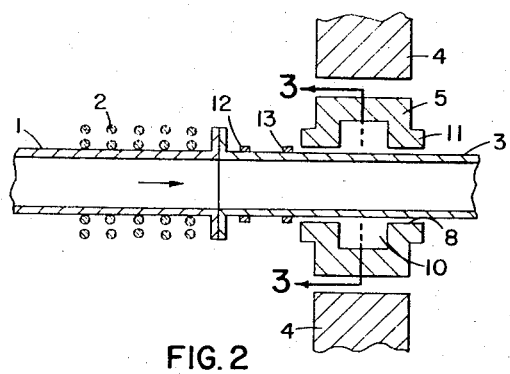
FIGURE 2 is a diagrammatic section illustrating in more detail the configuration of the components of my invention.

Referring now to FIGURE 2, it will be noted that the inner surface of cylinder 5 is relieved to form a microwave cavity 10. Cylinder 5 is made of copper and is provided with annular shoulders 11 which protrude from the lateral edges thereof to prevent radiation leakage.

Figure 3:
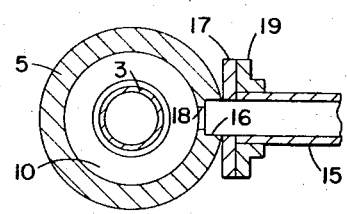
FIGURE 3 is a sectional view taken on line 3—3 of FIGURE 2.

As illustrated in FIGURE 3, energy communication between microwave cavity 10 and the paramagnetic resonance spectrometer is accomplished through a microwave conducting conduit 15. Conduit 15 provides microwave communication between the spectrometer and the relieved portion of cylinder 5 via a microwave passage 16 and an iris 18. The cylinder and the conduit are attached by connector blocks 17 and 19.

A more detailed reference is now made to the components of the apparatus and to their functions, in the following operating example. The electron paramagnetic spectrometer has been found to function most effectively when operating at a microwave frequency of $8.873 \times 10^9$ cycles per second and a field modulation frequency of between about 100 and 200 cycles per second. To provide the required field flux a 12 inch magnet 4 having a gap of approximately 3 inches is utilized so as to accommodate cylinder 5 which has an outside diameter of about 3 inches and an inside relieved diameter of about 2¾ inches.

Microwave cavity 10 which is formed within cylinder 5 operates in the TE011 mode with an unloaded "Q" of about 20,000. The lateral portions of cylinder 5 each contain a 1 inch axial opening which closely surrounds thin walled quartz tube 3. The cylinder is provided with protective shoulders 11 to minimize radiation leakage through these openings. The cylinder is placed in the DC field with its axis perpendicular to the field lines. The ratio of the magnetic field energy to the electric field energy in that portion of the cavity which is enclosed by the quartz tube will hereafter be referred to as the sample volume and is given by the expression $$\int (H_1)^2 dv / \int (E_1)^2 dv = \int_0^a (H_r^2 + 2H_z^2) r dr / \int_0^a E^2 \phi r dr$$

where the integral is taken over the sample volume, $a$ being the sample radius. $H_1$ and $E_1$ are the magnetic and electric field intensity components, in Gaussian units, perpendicular to the constant magnetic field. $H_r$, $H_z$ and $E_\phi$ are components of the total field intensity in cylindrical coordinates and contain the Bessel function $J_0$ and its derivative $J_0'$. Approximating the integrals by discrete summations yields a ratio of 5.5 to 1 for the previously defined sample volume.

The quartz tube passing through the microwave cavity is approximately 6 feet in length. Rocket motor exhaust gases are supplied at generally low pressures or may be bled into the inlet end of this tube and are pumped out at a rate of about 1 liter per minute over the pressure range of about 1 micron of Hg to about 10 millimeters of Hg. The diameter of the tubing between the inlet and the pump is greater than ¾ of an inch. The pressure drop between the inlet and the cavity is negligible.

An RF coil is employed as an exciter and consists of a primary and a secondary winding. The coil is placed 1 to 3 feet from the cavity and is energized by a transmitter operating at about 20 megacycles per second. Approximately 1 to 5 watts of power are transferred to the gas. With the exciter in operation the noise level detected by the electron paramagnetic resonance spectrometer at pressures above 50 microns is not appreciable even in the region of cyclotron resonance of free electrons at about 3,000 gauss. At pressures below 50 microns a rapid increase in noise level in the cyclotron resonance region as well as throughout the spectrum is observed. To reduce the noise in the vicinity of cyclotron resonance, a DC potential difference of 600 volts is applied between the RF discharge region and the cavity. This is achieved by surrounding the tube with conductive sleeves 12 and 13 which in turn are connected to a DC source.

Since the hydroxyl radical is of importance in the analysis of rocket motor exhaust gases a brief discussion of its characteristics will be helpful as an example of the physics involved in paramagnetic resonance measurements.

Of primary interest in this case is the ground vibrational level of the $^2\pi_{3/2}$ ground electronic state of OH. This is the state whose $J=3/2$ and $J=5/2$ rotational substates produce transitions which are observed as paramagnetic resonance spectra. The energy levels of this state (and thereby of its substrates) are split into pairs of levels called lambda doublets through its interaction with the $^2\Sigma_{1/2}$ electronic state.

The effect of doubling is observed in the rotational energy levels, in the Zeeman energy levels, and in the magnetic hyperfine energy levels of the radical. The diatomic radical OH has an end-over-end rotation, the angular momentum of which must be added to its electronic orbital angular momentum, its electronic spin angular momentum, and its nuclear spin angular momentum to obtain its total angular momentum. The manner in which these angular momenta are coupled is of great importance, particularly in the determination of the magnetic moment and magnetic hyperfine structure of the radical. In fields of from 4,000 to 10,000 gauss, the nucleus of the hydrogen atom in OH becomes completely decoupled from the remaining angular momenta whose coupling otherwise remains essentially unchanged. This decoupling and the addition of a quadratic interaction term dependent on the square of the magnetic field are the only additional energy effects which are normally considered in setting up the Hamiltonian for the OH radical. Upon applying the perturbation theory to this Hamiltonian an energy equation may be obtained which exhibits a splitting of levels due to lambda doubling. This splitting is then carried over into the allowed frequencies for absorption of energy by the OH radical.

In order that the electron paramagnetic spectrometer readings be meaningful it is necessary that a gas having known concentration be utilized as a standard upon which to base the concentration of the gases being analyzed. By using a gaseous sample as a standard many difficulties arising from dissimilarity in phase, structure and geometry are eliminated.

A gas having a spectrum which lies in the region desirable for the analysis of rocket motor exhaust products is nitric oxide. Conveniently, this gas also fits the requirements imposed on an electron paramagnetic resonance standard. Nitric oxide ordinarily has an easily observable spectrum of nine distinct lines falling within the magnetic field range of 8,000 to 9,000 gauss at a microwave frequency of around $9 \times 10^9$ cycles per second. Because of its paramagnetic properties, the molecular and paramagnetic concentration of a given quantity of nitric oxide can be accurately determined and described. However, due to the fact that it is subject to lambda doubling, each of the observed nine lines may be the resultant of an essentially degenerate magnetic dipole singlet surrounded by an electric dipole on non degenerate doublet with a separation width of between 1 and 2 gauss. Electric dipole transitions arise between unlike doublet components while magnetic dipole transitions arise between like doublet components. Unless the average magnetic energy in the cavity far exceeds the electric energy, the ratio of $\mu^2_e/\mu^2_0$ (where $\mu_e$ is the permanent electric dipole moment for nitric oxide and $\mu_0$ is the Bohr magneton) will exceed the average value of $H^2/E^2$ over the sample where H is the magnetic field energy and E is the electric energy. Thus, the magnetic dipole transitions will be overshadowed by their electric counterparts. In general, it should be of interest to include the magnetic dipole effect. This requirement, together with the necessity of extremely low pressure and low microwave power needed to resolve the electric doublet makes it desirable to formulate an expression which would enable one to use as a standard any of the nine easily observed composite nitric oxide lines. To derive this expression, the effect of saturation due to the greater magnitude of $\mu_e$ must be considered. This consideration is unnecessary in a treatment where only $\mu_0$ is involved.

Figure 4:
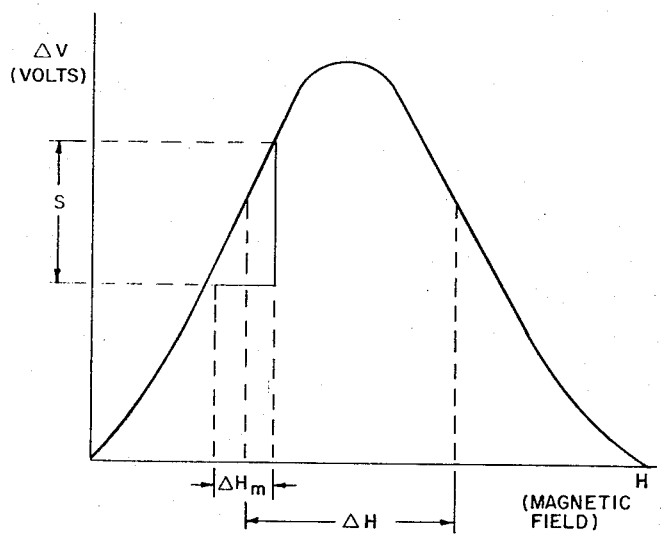
FIGURE 4 is a graphic illustration of the formation of the signals displayed by the electron-paramagnetic resonance spectrometer.

Electron paramagnetic resonance is detected and quantitatively analyzed by performing the following operations and calculations. The magnetic field in which the cavity containing the sample is located is varied monotonically through the sample resonance region. Absorption of energy by the sample from the cavity occurs during resonance producing a voltage deviation in the reflected cavity signal. The scanning field is modulated and the resulting derivative of the voltage deviation is observed. It should be noted here that the receiver crystal is biased to operate in the linear region. Through use of field modulation with a derivative signal a higher sensitivity can be obtained. Referring now to the plot illustrated in FIGURE 4 and to the following equations let ΔV be the voltage deviation coming from the microwave bridge, S the displayed signal, $\Delta H_m$ the modulation amplitude and ΔH the line width. It is apparent from FIGURE 4 that when $$\Delta H_m \ll \Delta H$$

then $$S = \Delta H_m d(\Delta V)/dH$$

It is now possible to relate the quantity $d(\Delta V)/dH$ to the power incident on the cavity $P_i$ and the power absorbed by the sample $P_a$ such that $$S = C(\Delta H_m/P_i^{1/2})dP_a/dH$$

where C is a proportionality constant that can be calculated from a standard gas sample. The quantity C may then be held constant over a series of measurements on a variety of other gaseous samples to obtain concentration measurements on the paramagnetic or free radical species present in these samples since the power absorbed by the paramagnetic species may be simply related to the concentration of that species.

A simplified explanation of the method of operation of the analyzer would include the following steps. The products are introduced into the quartz tube and may be further excited by the electromagnetic exciter 2 if necessary. The gases enter the microwave cavity where, depending upon the conditions within the cavity, they may absorb energy. These conditions are governed by variation of the modulated DC magnetic field strength, the pressure within the tube and the paramagnetic species themselves. The absorption of energy by the paramagnetic species causes an unbalance in the microwave circuit resulting in a signal which is detected and graphically displayed in differential form by the spectrometer.

It is apparent that the use of the electromagnetic exciter will be necessary only when the gas sample to be analyzed does not enter the device at the desired state of excitation. The gaseous discharge from rocket motors may be expected to exit in a state of excitation which permits substantial analyzation without the addition of further energy. Also, the use of a DC electric field between the exciter and the microwave cavity is necessary only under conditions of high noise level which occur usually in the vicinity of cyclotron resonance.

While the foregoing is a description of the preferred embodiment the following claims are intended to include those modifications and variations that are within the spirit and scope of my invention.

I claim:

1. A gas analyzer comprising a gas inlet line, an electromagnetic exciter for energizing gases to an increased state of excitation within said line, a quartz tube attached to said inlet line, a microwave cavity surrounding a portion of said quartz tube, means for providing a magnetic field of variable strength within said cavity, means for supplying microwave energy to said microwave cavity, means for detecting in relation to the strength of the magnetic field the amount of energy absorbed by gases within said cavity and means for drawing gases through said inlet and tube at pressures below atmospheric.

2. A device as set forth in claim 1 wherein said exciter comprises a radio frequency discharge coil having a primary and secondary winding.

3. A device as set forth in claim 2 wherein said means for supplying and detecting said microwave energy comprises an electron-paramagnetic resonance spectrometer.

4. A device as set forth in claim 3 wherein said spectrometer operates at a microwave frequency of about $8.873 \times 10^9$ cycles per second and a field modulation frequency of about 200 cycles per second.

5. A device as set forth in claim 4 wherein a DC potential is applied to said tube between said exciter and said cavity.

6. A device as set forth in claim 5 wherein said gas drawing means is a pump operating at a pressure of from about 1 micron of Hg to about 10 millimeters of Hg.

7. A gas analyzer comprising a gas inlet line, a quartz tube attached to said inlet line, a microwave cavity surrounding a portion of said quartz tube, means for providing a magnetic field of variable strength within said cavity, means for supplying microwave energy to said cavity, means for detecting in relation to the strength of the magnetic field the amount of energy absorbed by exhaust gases within said cavity, means for drawing exhaust gases through said inlet and tube at pressures below atmospheric, and means connected to said quartz tube for applying a DC electric field within said quartz tube upstream of said microwave cavity.

8. A device as set forth in claim 7 wherein said means for supplying and detecting said microwave energy comprises an electron paramagnetic resonance spectrometer.

9. A device as set forth in claim 8 wherein said spectrometer operates at a microwave frequency of about $8.873 \times 10^9$ cycles per second and a field modulation frequency of about 200 cycles per second.

10. A device as set forth in claim 7 wherein said gas drawing means comprises a pump operating at a pressure of from about 1 micron of Hg about 10 millimeters of Hg.

References Cited

UNITED STATES PATENTS

| | | | |
|---|---|---|---|
| 2,888,638 | 5/1959 | Nelson | 324—0.5 |
| 2,957,128 | 10/1960 | Spry | 324—0.5 |
| 3,024,410 | 3/1962 | Moser | 324—0.5 |
| 3,080,520 | 3/1963 | O'Reilly | 324—58.5 |
| 3,191,119 | 6/1965 | Singer | 324—0.5 |
| 3,287,629 | 11/1966 | Varian | 324—0.5 |

RUDOLPH V. ROLINEC, *Primary Examiner.*

M. LYNCH, *Assistant Examiner.*